US009172962B2

United States Patent
Nguyen et al.

(10) Patent No.: US 9,172,962 B2
(45) Date of Patent: Oct. 27, 2015

(54) METHODS AND SYSTEMS FOR PIPELINING WITHIN BINARY ARITHMETIC CODING AND DECODING

(75) Inventors: Nguyen Nguyen, Waterloo (CA); Tianying Ji, Waterloo (CA); Dake He, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 861 days.

(21) Appl. No.: 13/354,437

(22) Filed: Jan. 20, 2012

(65) Prior Publication Data

US 2013/0188724 A1  Jul. 25, 2013

(51) Int. Cl.
| | |
|---|---|
| *H04N 11/02* | (2006.01) |
| *H04B 1/66* | (2006.01) |
| *H04N 19/129* | (2014.01) |
| *H04N 19/91* | (2014.01) |
| *H04N 19/176* | (2014.01) |
| *H04N 19/51* | (2014.01) |
| *H04N 19/593* | (2014.01) |

(52) U.S. Cl.
CPC ........... *H04N 19/129* (2014.11); *H04N 19/176* (2014.11); *H04N 19/51* (2014.11); *H04N 19/91* (2014.11); *H04N 19/593* (2014.11)

(58) Field of Classification Search
CPC combination set(s) only.
See application file for complete search history.

(56) References Cited

U.S. PATENT DOCUMENTS

| 5,613,091 | A * | 3/1997 | Stone et al. ............... 711/171 |
|---|---|---|---|
| 2008/0219578 | A1 * | 9/2008 | Lee ............................. 382/247 |
| 2012/0183235 | A1 * | 7/2012 | Sasai et al. ................ 382/233 |
| 2013/0114698 | A1 * | 5/2013 | Lou et al. ................ 375/240.03 |
| 2013/0177070 | A1 * | 7/2013 | Seregin et al. ........... 375/240.02 |
| 2013/0188735 | A1 * | 7/2013 | Nguyen et al. .......... 375/240.25 |
| 2013/0188736 | A1 * | 7/2013 | Kim et al. ................ 375/240.25 |
| 2013/0322547 | A1 * | 12/2013 | Lou et al. ................ 375/240.24 |

OTHER PUBLICATIONS

EPO, Extended European Search Report relating to application No. 12151970, dated Jul. 9, 2012.
Maniccam S S et al., "Lossless Compression and Information Hiding in Images", Pattern Recognition, Elsevier, GB, vol. 37, No. 3, Mar. 1, 2004, XP004478997.
Rosewarne C et al., "Non-Cell: Modified Context Selection for Significant Coefficient Flags with Diagonal Sub-block Scan", 7. JCT-VC Meeting: 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-G958, Nov. 18, 2011.

(Continued)

*Primary Examiner* — David Czekaj
*Assistant Examiner* — Tyler W Sullivan
(74) *Attorney, Agent, or Firm* — Rowand LLP

(57) ABSTRACT

Methods of encoding and decoding for video data are described for encoding or decoding multi-level significance maps while enabling pipelining of the BAC engine. In one example, coefficient groups are redefined to remove the significant-coefficient flags of the first and last position of a block and replace them with significant-coefficient flags of the last position in the previous block and the first position in the next block. A modified scan order is applied to each coefficient group. In another example, the coefficient groups remain block-based, but the scan order is modified to interleave the encoding and decoding sequential coefficient groups.

21 Claims, 12 Drawing Sheets

(56) References Cited

OTHER PUBLICATIONS

Sole J: "Cross-check of RIM's Multi-Level Significant Maps for Large Transform Units (JCTVC-G644)", 7. JCT-VC Meeting; 98. MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-G1001, Nov. 24, 2011, XP030110985.

USTPO, US Office Action relating to U.S. Appl. No. 13/354,448, dated May 28, 2014.

Marpe, H. Schwarz, and T. Wiegand, "Context-based adaptive binary arithmetic coding in the h.264/AVC video compression standard," IEEE Transactions on Circuits and Systems for Video Technology, 13(7):620-636, Jul. 2003.

B. Bross, W-J Han, J-R Ohm, G. J. Sullivan, and T. Wiegand, "WD4: Working Draft 4 of High-Efficiency Video Coding," JCT-VC of ITU-T SG16 WP3 and ISO/IEC JTC1/SC29/WG11, 6th Meeting, Torino, Jul. 2011.

F. Bossen, "Common test conditions and software reference configurations", JCTVC-F900, JCT-VC of ITU-T SG16 WP3 and ISO/IEC JTC1/SC29/WG11, 6th Meeting, Torino, Jul. 2011.

T. Nguyen, T. Winken, D. Marpe et al., "Reduced-complexity entropy coding of transform coefficient levels using a combination of VLC and PIPE", JCTVC-D336, JCT-VC of ITU-T SG16 WP3 and ISO/IEC JTC1/SC29/WG11, 4th Meeting, Daegu, Jan. 2011.

J. Sole, R. Joshi, M. Karczewicz, "Non-CE11: Diagonal sub-block scan for HE residual coding", JCT-VC of ITU-T SG16 WP3 and ISO/IEC JTC1/SC29/WG11, 7th Meeting, Geneva, Nov. 2011.

B. Bross, W-J Han, J-R Ohm, G. J. Sullivan, and T. Wiegand, "WD5: Working Draft 4 of High-Efficiency Video Coding," JCTVC-G1103_d4, JCT-VC of ITU-T SG16 WP3 and ISO/IEC JTC1/SC29/WG11, 7th Meeting, Geneva, Nov. 2011.

N. Nguyen, T. Ji, D. He, G. Martin-Cocher and L. Song, "Multiple Level Significance Maps for Large Transform Units", JCT-VC of ITU-T SG16 WP3 and ISO/IEC JTC1/SC29/WG11, 7th Meeting, Geneva, Nov. 2011.

Joel Sole, Rajan Joshi, Maria Karczewicz, JCTVC-G323, "Non-CE11: Diagonal sub-block scan for HE residual coding", Joint Collaborative Team on Video Coding (JCT-VC) of ITU-T SG16 WP3 and ISO/IEC JTC1/SC29/WG11 7th Meeting: Geneva, CH, Nov. 21-30, 2011.

V. Sze, "On Significance Map Coding in CABAC", JCT-VC of ITU-T SG16 WP3 and ISO/IEC JTC1/SC29/WG11, 7th Meeting, Geneva, Nov. 2011.

M. Karczewicz, I. Chung, X. Wang and R. Joshi, "Study of Entropy Coding Methods Complexity", JCT-VC of ITU-T SG16 WP3 and ISO/IEC JTC1/SC29/WG11, 7th Meeting, Geneva, Nov. 2011.

* cited by examiner

METHODS AND SYSTEMS FOR PIPELINING WITHIN BINARY ARITHMETIC CODING AND DECODING

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for encoding and decoding video using significance maps.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU: High Efficiency Video Coding (HEVC).

There are a number of standards for encoding/decoding images and videos, including H.264, that use block-based coding processes. In these processes, the image or frame is divided into blocks, typically 4×4 or 8×8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC will also have these features.

When spectrally transforming residual data, many of these standards prescribe the use of a discrete cosine transform (DCT) or some variant thereon. The resulting DCT coefficients are then quantized using a quantizer to produce quantized transform domain coefficients, or indices.

The block or matrix of quantized transform domain coefficients (sometimes referred to as a "transform unit") is then entropy encoded using a particular context model. In H.264/AVC and in the current development work for HEVC, the quantized transform coefficients are encoded by (a) encoding a last significant coefficient position indicating the location of the last non-zero coefficient in the block, (b) encoding a significance map indicating the positions in the block (other than the last significant coefficient position) that contain non-zero coefficients, (c) encoding the magnitudes of the non-zero coefficients, and (d) encoding the signs of the non-zero coefficients. This encoding of the quantized transform coefficients often occupies 30-80% of the encoded data in the bitstream.

Transform units are typically N×N. Common sizes include 4×4, 8×8, 16×16, and 32×32, although other sizes are possible, including non-square sizes in some embodiments, such as 8×32 or 32×8. The entropy encoding of the symbols in the significance map is based upon a context model. In the case of 4×4 or 8×8 luma or chroma blocks or transform units (TU), a separate context is associated with each coefficient position in the TU. The encoder and decoder must keep track of and look up a large number of different contexts during the encoding and decoding of the significance map. In the case of larger TUs, the context for encoding a significant flag may depend on the values of neighbouring significance flags. For example, the flag may have a context selected from four or five contexts depending on the values of neighbouring flags. In some instances, particular flags within a TU or sub-block of a TU may have a context based on position, such as the upper-left (DC) position.

The determination of context for the 16×16 and 32×32 significance maps is fairly computationally intense, because in most cases the processor determines context by looking at the values of neighboring significant flags, which involves costly memory access operations.

A binary arithmetic coding (BAC) engine has three stages: context determination or derivation, binary arithmetic coding (encoding or decoding), and probability estimate update. A non-pipelined BAC engine processes a binary symbol by completing all three stages before starting on the next symbol. A pipelined BAC engine attempts to start the next symbol before the current symbol has completed processing through all three stages.

Because context for a significant-coefficient flag is determined by the values of neighboring flags, the processing of a neighboring flag must be completed before it is used to determine context of a current flag, since its processing can impact the probability estimate for a particular context. Thus, it is difficult to maximize throughput per cycle when working with larger significance maps. Attempts to pipeline within the BAC engine can run into stalls.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
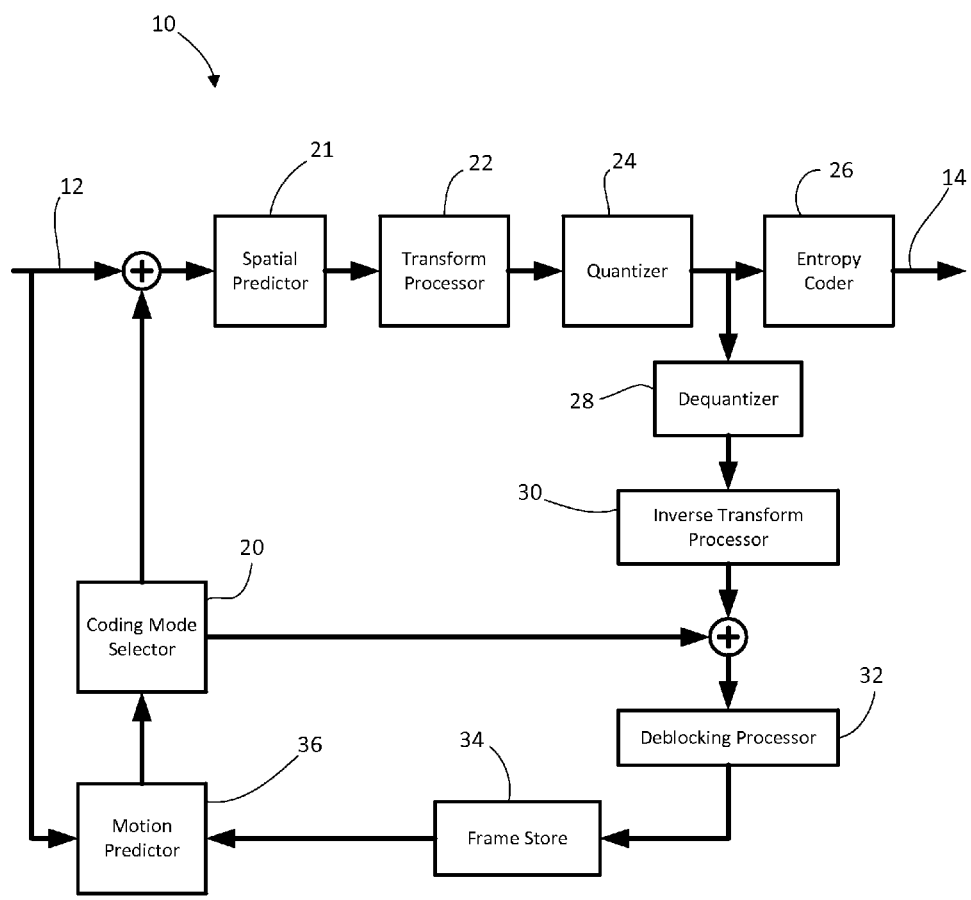
FIG. 1 shows, in block diagram form, an encoder for encoding video.

The present application describes methods and encoders/decoders for encoding and decoding significance maps with context-adaptive encoding or decoding. The encoder and decoder use multi-level significance maps. In at least one case, the multi-level maps are used with larger transform units, such as the 16×16 and 32×32 TUs.

In one aspect, the present application describes a method of decoding a bitstream of encoded video by reconstructing significant-coefficient flags for a transform unit, the transform unit comprising a sequence of blocks, the bitstream including sets of significant-coefficient flags, each set corresponding to a respective block, wherein the sets in the bitstream are ordered according to the sequence, the bitstream encoding the significant-coefficient flags of each set in a scan order. The method including, for a current one of the sets of significant-coefficient flags, decoding that current set in the scan order, wherein the scan order is a block-based diagonal scan modified to advance decoding of a significant-coefficient flag in a first position within the block corresponding to the current set to occur prior to decoding at least two significant-coefficient flags of a previous set in the sequence, and modified to delay decoding of a significant-coefficient flag in a last position within that block to occur after decoding at least two significant-coefficient flags in a subsequent set in the sequence.

In another aspect, the present application describes a method of decoding a bitstream of encoded video by reconstructing significant-coefficient flags for a transform unit, the transform unit comprising a sequence of blocks, the bitstream including sets of significant-coefficient flags, each set corresponding to a respective block, the bitstream sequencing the sets according to the order of their corresponding blocks, the bitstream encoding the significant-coefficient flags of each set in a scan order. The method includes, for each set of significant-coefficient flags, decoding that set in the scan order, wherein the scan order is a modification of a block-based diagonal scan, modified to exclude a first location within the block corresponding to the set and a last location within that block and modified to include a last location in a previous block and a first location in a next block, and wherein the locations are relative to the block-based diagonal scan.

In another aspect, the present application describes a method of decoding a bitstream of encoded video by reconstructing significant-coefficient flags for a transform unit, the transform unit comprising a sequence of blocks, the bitstream encoding sets of significant-coefficient flags, each set corresponding to a respective block. The method includes, for each set of significant-coefficient flags, decoding that set in a scan order, wherein the scan order is a diagonal scan within its respective block modified so as to decode a significant-coefficient flag in the bottom-right position within the respective block corresponding to the set, prior to decoding at least two significant-coefficient flags of a previous set in the sequence, and to decode a significant-coefficient flag in the upper-left position within that respective block, after decoding at least two significant-coefficient flags of a subsequent set in the sequence.

In yet another aspect, the present application describes a method of decoding a bitstream of encoded video by reconstructing significant-coefficient flags for a transform unit, the transform unit comprising a sequence of blocks, the bitstream including sets of significant-coefficient flags, each set corresponding to a respective block, the bitstream sequencing the sets according to the order of their corresponding blocks, and the bitstream encoding the significant-coefficient flags of each set in a scan order. The method includes, for each set of significant-coefficient flags, decoding that set in the scan order, wherein the scan order is a modification of a block-based diagonal scan, modified to exclude a bottom-right position within the block corresponding to the set and an upper-left position within that block and modified to include an upper-left location in a previous block and a bottom-right location in a next block.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing HEVC standard. Those ordinarily skilled in the art will understand that the present application is not limited to H.264/AVC or HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. It will also be appreciated that certain encoding/decoding operations are performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

The present application describes example processes and devices for encoding and decoding significance maps. A significance map is a block, matrix or group of flags that maps to, or corresponds to, a transform unit or a defined unit of coefficients (e.g. several transform units, a portion of a transform unit, or a coding unit). Each flag indicates whether the corresponding position in the transform unit or the specified unit contains a non-zero coefficient or not. In existing standards, these flags may be referred to as significant-coefficient flags. In existing standards, there is one flag per coefficient and the flag is a bit that is zero if the corresponding coefficient is zero and is set to one if the corresponding coefficient is non-zero. The term "significance map" as used herein is intended to refer to a matrix or ordered set of significant-coefficient flags for a transform unit, as will be understood from the description below, or a defined unit of coefficients, which will be clear from the context of the applications.

Although the examples described herein relate to significance maps, the multi-level encoding and decoding processes may be applied to other syntax elements in video coding, e.g., coefficient levels, filter coefficients, and motion vectors (after binarization), which may exhibit group structures. For example, a local group of coefficient levels might be all one with high probability. Similarly, a local group of motion vectors might be all zero in one direction (zero horizontal movement for example), or a set of filter coefficients may be all zero in neighboring frequency bands.

It will also be understood, in light of the following description, that the multi-level encoding and decoding structure might be applied in certain situations, and those situations may be determined from side information like video content type (natural video or graphics as identified in sequence, picture, or slice headers). For example, two levels may be used for natural video, and three levels may be used for graphics (which is typically much more sparse). Yet another possibility is to provide a flag in one of the sequence, picture, or slice headers to indicate whether the structure has one, two, or three levels, thereby allowing the encoder the flexibility of choosing the most appropriate structure for the present content. In another embodiment, the flag may represent a content type, which would be associated with the number of levels. For example, a content of type "graphic" may feature three levels.

Figure 2:
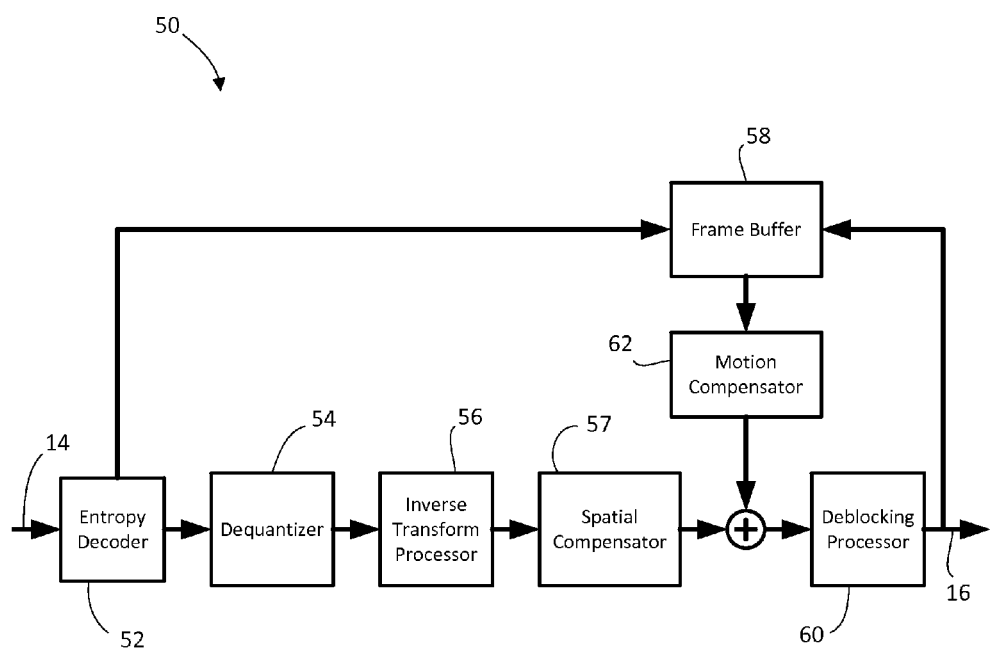
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a coding unit, macroblock or sub-block basis, depending on the size of the macroblocks or coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

The block or matrix of quantized transform domain coefficients may be referred to herein as a "transform unit" (TU). In some cases, the TU may be non-square, e.g. a non-square quadrature transform (NSQT).

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks or coding units to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock or coding unit, the recreated "video data" is the residual data for use in spatial compensation relative to a previously decoded block within the frame. The spatial compensator 57 generates the video data from the residual data and pixel data from a previously decoded block. In other cases, such as inter-coded macroblocks or coding units, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock or coding unit. It does so based on the reference frame information and motion vector specified for the inter-coded macroblock or coding unit. It then supplies the reference block pixel data for combination with the residual data to arrive at the reconstructed video data for that coding unit/macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

Significance Map Encoding

As noted above, the entropy coding of a block or set of quantized transform domain coefficients includes encoding the significance map (e.g. a set of significant-coefficient flags) for that block or set of quantized transform domain coefficients. The significance map is a binary mapping of the block indicating in which positions (other than the last position) non-zero coefficients appear. The block may have certain characteristics with which it is associated. For example, it may be from an intra-coded slice or an inter-coded slice. It may be a luma block or a chroma block. The QP value for the slice may vary from slice to slice. All these factors may have an impact on the best manner in which to entropy encode the significance map.

The significance map is converted to a vector in accordance with the scan order (which may be vertical, horizontal, diagonal, zig zag, or any other scan order prescribed by the applicable coding standard). The scan is typically done in "reverse" order, i.e. starting with the last significant coefficient and working back through the significant map in reverse direction until the flag at [0,0] is reached. In the present description, the term "scan order" is intended to mean the order in which flags, coefficients, or groups, as the case may be, are processed and may include orders that are referred to colloquially as "reverse scan order".

Each significant-coefficient flag is then entropy encoded using the applicable context-adaptive coding scheme. For example, in many applications a context-adaptive binary arithmetic coding (CABAC) scheme may be used.

With 16×16 and 32×32 significance maps, the context for a significant-coefficient flag is (mostly) based upon neighboring significant-coefficient flag values. Among the contexts used for 16×16 and 32×32 significance maps, there are certain contexts dedicated to the bit position at [0,0] and (in some example implementations) to neighboring bit positions, but most of the significant-coefficient flags take one of four or five contexts that depend on the cumulative values of neighboring significant-coefficient flags. In these instances, the determination of the correct context for a significant-coefficient flag depends on determining and summing the values of the significant-coefficient flags at neighboring locations (typically five locations, but it could be more or fewer in some instances).

In previous work, the present applicants described the use of multi-level significance maps, in which the significance map of a transform unit is partitioned into coefficient groups and each coefficient group is encoded in a predefined order. Within each coefficient group (which may be a block/sub-block) the significant-coefficient flags are processed in a scan order. Each coefficient group is associated with a significant-coefficient-group flag, which indicates whether that coefficient group may be considered to contain non-zero significant-coefficient flags. Reference may be made to U.S. patent application Ser. No. 13/279,397 filed Oct. 24, 2011, entitled "Significance Map Encoding and Decoding Using Partition Selection"; U.S. patent application Ser. No. 13/286,336, filed Nov. 1, 2011, entitled "Multi-level Significance Maps for Encoding and Decoding"; and U.S. patent application Ser. No. 61/561,872, filed Nov. 19, 2011, entitled "Multi-level Significance Map Scanning". The contents of all three applications are hereby incorporated by reference.

Figure 3:
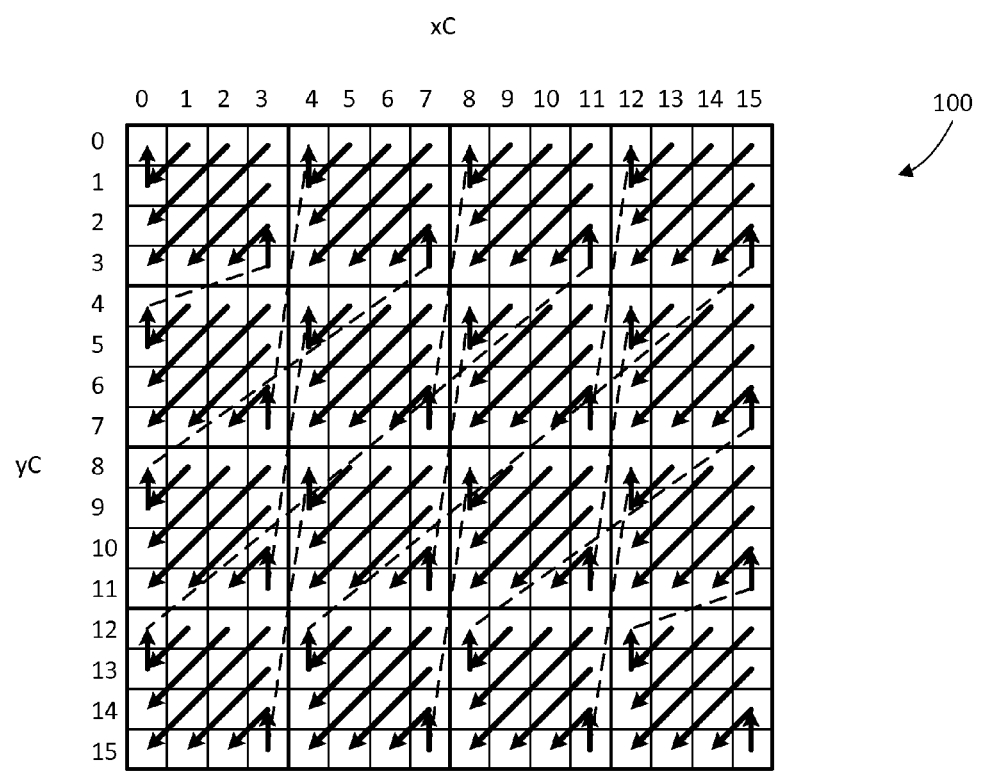
FIG. 3 shows, an example of a multi-level scan order for a 16×16 transform unit.

One of the techniques described in the foregoing applications is implementation of a one-pass scanning process; i.e. a group-based or multi-level scanning order. Reference is now made to FIG. 3, which shows a 16×16 transform unit 100 with a multi-level diagonal scan order illustrated. The transform unit 100 is partitioned into sixteen contiguous 4×4 coefficient groups or "sets" of significant-coefficient flags. Within each coefficient group, a diagonal scan order is applied at the group-level, rather than across the whole transform unit 100. The sets or coefficient groups themselves are processed in a scan order, which in this example implementation is also a diagonal scan order. It will be noted that the scan order in this example is illustrated in "reverse" scan order; that is, the scan order is shown progressing from the bottom-right coefficient group in a downward-left diagonal direction towards the upper-left coefficient group. In some implementations the same scan order may be defined in the other direction; that is, progressing in a upwards-right diagonal direction and when applied during encoding or decoding may be applied in a "reverse" scan order.

In order to facilitate discussion for the purpose of the present application, the coefficients of a 4×4 coefficient group (or set) are indexed as follows:

| 15 | 13 | 10 | 6 |
|----|----|----|---|
| 14 | 11 | 7  | 3 |
| 12 | 8  | 4  | 1 |
| 9  | 5  | 2  | 0 |

It will be appreciated that diagonal is one option, and in other embodiments horizontal, vertical, zig-zag, or other scan orders may be applied, within the coefficient groups and/or at the group-level for ordering the processing of the coefficient groups.

When symbols are processed sequentially (whether for encoding or decoding), i.e., non-pipelined, the BAC engine is not fully utilized. Each binary symbol goes through the three stages of processing (c-b-p: context derivation, binary arithmetic coding, probability update) without any other symbol being processed at the same time. Assuming one cycle is required for each BAC engine stage, encoding or decoding one symbol uses three cycles.

When processing is done in a pipeline, the BAC engine can be fully utilized as long as the context of the current encoded or decoded symbol can be determined at the beginning of "c" stage. By using speculative execution and arranging the order of the encoding and decoding appropriately, we can meet this requirement and fill up the pipeline at any time except for the prologue, epilogue, and special cases. When a full pipeline is established, the throughput of the BAC engine is improved to three times that of the sequential processing.

The non-pipelined vs. pipelined processing is shown in the tables below, where G(s, t) means execution of stage s for bin index t, and j is the cycle count. It shows that for the same number of cycles, the pipelined BAC engine has three times greater bin throughput than the non-pipelined one.

| non-pipelined BAC engine | | | |
|---|---|---|---|
| | c | b | p |
| j = 0 | G(c, 0) | | |
| j = 1 | | G(b, 0) | |
| j = 2 | | | G(p, 0) |
| j = 3 | G(c, 1) | | |
| j = 4 | | G(b, 1) | |
| j = 5 | | | G(p, 1) |
| ... | ... | ... | ... |

-continued

| non-pipelined BAC engine | | | |
|---|---|---|---|
| | c | b | p |
| j = n | G(c, n/3) | | |
| j = n + 1 | | G(b, n/3) | |
| j = n + 2 | | | G(p, n/3) |

| | pipelined BAC engine | | | |
|---|---|---|---|---|
| | | c | b | p |
| prologue | j = 0 | G(c, 0) | | |
| | j = 1 | G(c, 1) | G(b, 0) | |
| | j = 2 | G(c, 2) | G(b, 1) | G(p, 0) |
| | j = 3 | G(c, 3) | G(b, 2) | G(p, 1) |
| | j = 4 | G(c, 4) | G(b, 3) | G(p, 2) |
| | j = 5 | G(c, 5) | G(b, 4) | G(p, 3) |
| | ... | ... | ... | ... |
| | j = n | G(c, n) | G(b, n − 1) | G(p, n − 2) |
| epilogue | j = n + 1 | | G(b, n) | G(p, n − 1) |
| | j = n + 2 | | | G(p, n) |

The pipelined BAC engine may run into problems where the context of a significant-coefficient flag is dependent upon its neighboring flags. For example with size 16×16 or 32×32 transform units, the context of significant-coefficient flag "x" is dependent upon the five neighboring flags as follows:

```
x  o  o o  o o
```

This means that provided the significant-coefficient flags in the "o" positions are processed at least three cycles prior to the symbol in the "x" position then the processing of the "x" flag will not impact the pipelining. With conventional transform-unit-based scan orders this is usually the case, except for the five coefficient flags in the bottom right corner of the transform unit. In some embodiments, those five flags may be assigned a context based on their positions, rather than on the values of their neighbours. The same issue may arise in the upper left corner; however, the upper five flags have a context that is based on position, not on neighboring flags, which eliminates this problem.

The problem of BAC engine stalls becomes more significant in the case of a multi-level map scan order in which the significant-coefficient flags within each coefficient group are processed in scan order within the coefficient group, as illustrated in FIG. 3. In this case, data dependencies arise in the lower-right and upper-left portions of every coefficient group. For example, with a diagonal scan order like that illustrated in FIG. 3, positions 1, 2, 3, 4, 13, 14, and 15 in every coefficient group have data dependencies during context derivation that will prevent the BAC engine from being fully utilized.

Modified Scan Order

In general, the multi-level scan order in which significant-coefficient flags are processed may be modified to avoid data dependencies that cause BAC engine stalls. In short, at the end of a cycle M, if the next bin to be encoded or decoded has a dependency that would introduce a stall in the BAC engine during cycle M+1, look ahead in the scan order and instead encode or decode a bin whose context can be determined at the beginning of M+1.

Note that the present application may use the terms "coefficient group" and "set of significant-coefficient flags" interchangeably. They are intended to have the same meaning.

In a first embodiment, the scan order is modified so as to time the processing of particular flags to avoid data dependencies. Leaving aside the special cases that occur in the bottom-right corner or upper-left corner of the transform unit, the scan order within a block excludes the bottom-right (index 0) position of the block and the upper-left (index 15) position in the block. Instead, in place of the bottom-right position of the block the scan order processes the upper-left position of the previous block; and, instead of the upper-left position in the block, the scan order processes the bottom-right position of the next block. The terms "previous block" and "next block" refer to the sequence or order in which the individual blocks are processed, i.e. the block-level scan order. In one sense, this embodiment may be considered to involve a redefinition of the coefficient groups. That is, it may be considered as defining a non-block-based coefficient group, so as to avoid the data dependencies. Rather than each coefficient group being a 4×4 block of significant-coefficient flags, each coefficient group in this embodiment is the 4×4 set excluding the upper-left and lower-right flags and including an upper-left flag from the previous block and a lower-right flag from the next block. The set of significant-coefficient flags within the coefficient group is scanned in the modified scan order. Each coefficient group is scanned in turn. As will be described further below, a second embodiment maintains the block-based coefficient groups and realizes the same modified scan order by jumping between coefficient groups whilst processing the flags.

Figure 4:
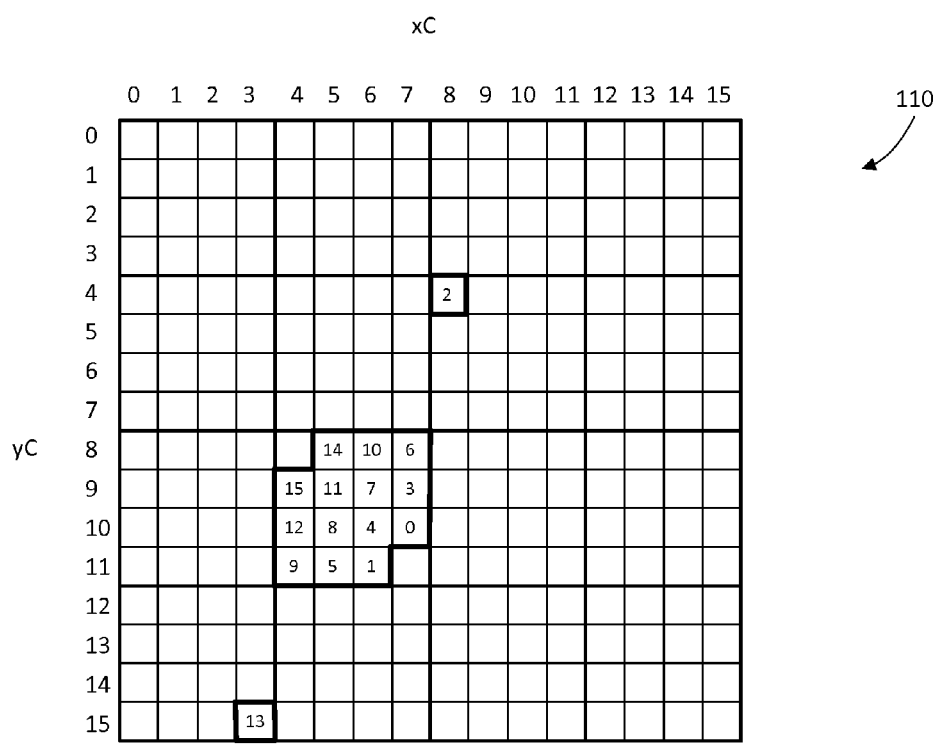
FIG. 4 shows an example illustration of one implementation of a modified scan order through a redefinition of the coefficient group shape.

Reference is now made to FIG. 4, which diagrammatically illustrates the first embodiment of a modified scan order. FIG. 4 shows a 16×16 transform unit 110. The transform unit 110 is shown notionally divided into 4×4 blocks for ease of illustration. Under the scan order illustrated in FIG. 3, all sixteen significant-coefficient flags in each block would be diagonally scanned before moving to the next block ("next block" means next in a group level scan order, which in this example embodiment is also diagonal). In this case, the modified scan order shifts the processing of the upper-left flag and the lower-right flag in each block into the adjacent block. The numbering of the significant-coefficient flag positions indicates the scan order for respective flags 0, 1, . . . 15 for an example coefficient group. In this example case, the scan order (index 0) begins with what was previously position 1 in the 4×4 indexing convention described above. Index 2 is taken from the last position (upper left flag) of the previous block. Index 13 is taken from the first position (lower right flag) of the next block.

Figure 5:
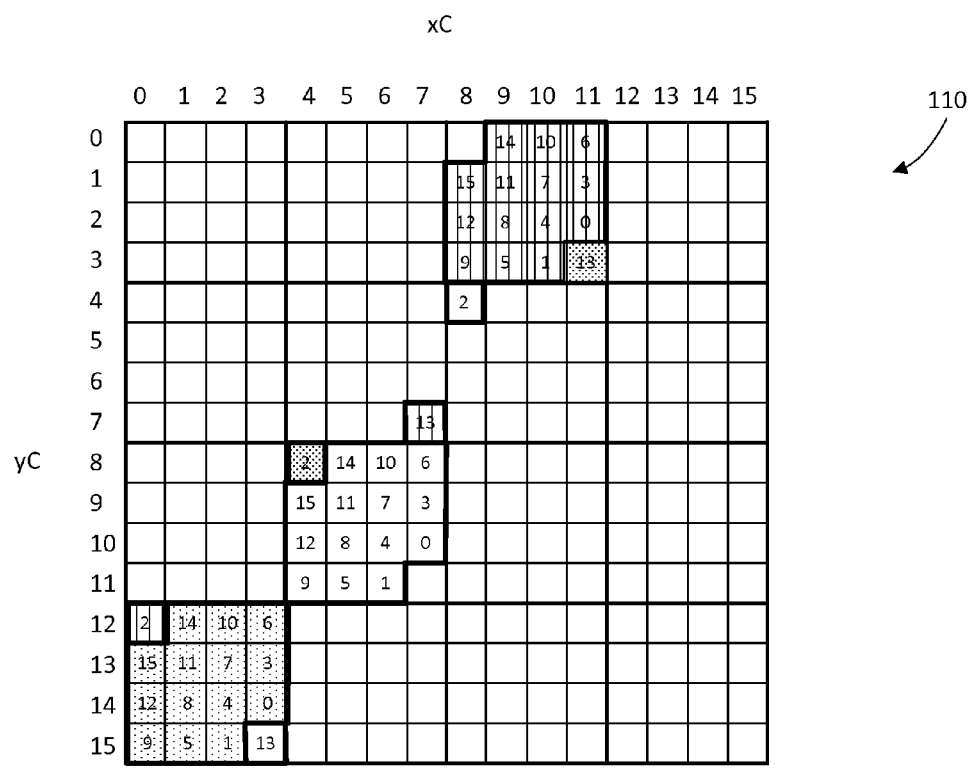
FIG. 5 shows the transform unit of FIG. 4 with three coefficient groups illustrated.

FIG. 5 shows the transform unit 110 of FIG. 4 with additional coefficient groups illustrated in their scan order. Shading indicates which significant-coefficient flags belong to a common coefficient group.

Figure 6:
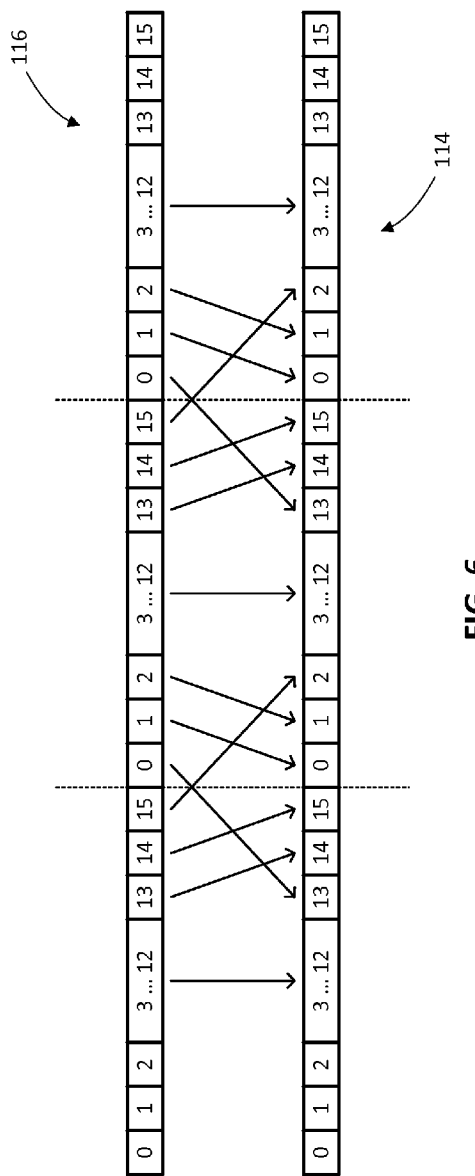
FIG. 6 illustrates a mapping of the block-based diagonal scan order of FIG. 3 to the modified scan order.

FIG. 6 shows a linear illustration of the modified scan order 114 as a mapping from the sub-block scan order 116, where the sub-block scan order corresponds to the scan order illustrated in FIG. 3. It will be noted that the resulting coefficient groups in the modified scan order 114 still each contain sixteen significant-coefficient flags. The flags in positions 3 through 12 are unchanged in terms of their position in the scan order. In effect, what has occurred is that the significant-coefficient flag that was formerly processed first in the scan order, i.e. index 0, has been moved up by three cycles to be processed at index 13 in the previous coefficient group, and the significant-coefficient flag that was formerly processed last, i.e. index 15, in the scan order has been delayed three cycles to be processed at index 2 in the next coefficient group. This results in the processing of the significant-coefficient flags at index 1 and index 2 advancing by one cycle to index 0 and index 1, respectively, and results in the processing of significant-coefficient flags at index 13 and 14 being delayed by one cycle to index 14 and index 15, respectively.

The modifications to the scan order are based on the geometry of the former block-based coefficient groups, the diagonal scan order applied within the block, and the context model. The modifications reflected in FIGS. 4 to 6 avoid the data dependencies because the significant-coefficient flag formerly processed at index 0 (i.e. first in the scan order), is now processed three cycles earlier during the processing of the previous coefficient group. This means that the BAC engine will be done processing that lower left significant-coefficient flag when it starts with index 0 in the modified scan order (the significant-coefficient flag immediately above the lower-right significant-coefficient flag). Thus the lower-right significant-coefficient flag is available for context determination.

Similarly, at the upper-left corner of the block, the processing of the upper-left significant-coefficient flag is delayed by three cycles so that it is processed during the processing of the next coefficient group. This means that the BAC engine will be done processing the neighboring significant-coefficient flags to the right and below the upper-left significant-coefficient flag by the time it starts on the upper-left significant-coefficient flag, and the neighboring significant-coefficient flags will be available for context determination.

Accordingly, the modified scan order shown in FIGS. 4-6 permits efficient pipelining of the BAC engine without risk of stalls.

It will be appreciated that the illustrations shown in FIGS. 4-6 do not address the significant-coefficient flags in the bottom-right of the transform unit or the upper-left of the transform unit because these flags have a context that is dependent on coefficient position and not upon neighboring flags, so they do not present an issue for BAC engine stalls. Practical implementations in hardware or software may incorporate exception handling into the encoding/decoding routines to manage these special cases (among others).

In a variation to this embodiment, the modified scan order is based upon a block-based zig-zag scan instead of a diagonal scan.

As described in previous applications, such as U.S. patent application Ser. No. 13/286,336, filed Nov. 1, 2011, entitled "Multi-level Significance Maps for Encoding and Decoding"; and U.S. patent application Ser. No. 61/561,872, filed Nov. 19, 2011, entitled "Multi-level Significance Map Scanning", the use of multi-level significance maps involves the encoding of an L1 or higher level significance map that indicates which coefficient groups may be expected to contain non-zero significant-coefficient flags, and which coefficient groups contain all zero significant-coefficient flags. The coefficient groups that may be expected to contain non-zero significant-coefficient flags have their significant-coefficient flags encoded, whereas the coefficient groups that contain all zero significant-coefficient flags are not encoded (unless they are groups that are encoded because of a special case exception because they are presumed to contain at least one non-zero significant-coefficient flag). Each coefficient group has a significant-coefficient-group flag (unless a special case applies in which that coefficient group has a flag of a presumed value, such as the group containing the last significant coefficient, the upper left group, etc.).

The significant-coefficient group flags are encoded based on their context. Some of the example context models described in the previous applications were based upon the significant-coefficient-group flags of neighboring coefficient groups. For example, one proposed context model for encoding a significant-coefficient-group flag determines context based on the value of the significant-coefficient-group flags of the coefficient group to the right and the coefficient group below.

It will be appreciated that the modified scan order may introduce some inaccuracies in a context model for significant-coefficient-group flags that are based on the significant-coefficient-group flags of "adjacent" groups, since the coefficient groups are no longer contiguous blocks. Instead, with the modified scan order, each coefficient group is a mostly contiguous block with up to two outliers. As shown in FIG. 5, the outliers may by physically geometrically separated from the rest of the significant-coefficient flags of the coefficient group by a substantial distance. This means that the value of that outlier flag does not necessarily correlate well with the values of the flag in a group neighboring the rest of the significant-coefficient flags.

Therefore, in one embodiment, the context model for significant-coefficient-group flags may be based not upon the neighboring significant-coefficient-group flags, but upon whether there is a non-zero significant-coefficient flag in the neighboring coefficient group excluding the outlier significant-coefficient flags, i.e. the significant-coefficient flags at indexes 2 and 13.

Figure 7:
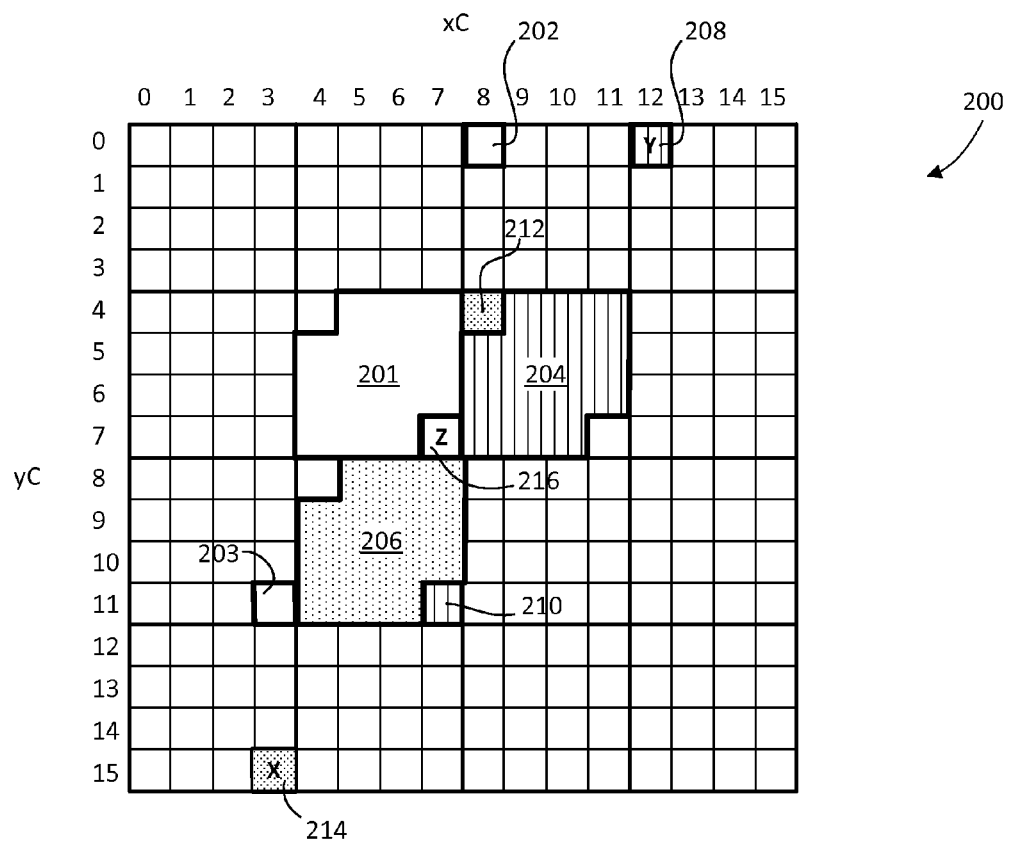
FIG. 7 diagrammatically illustrates a transform unit with the redefined coefficient groups.

In yet another embodiment, the context model includes the "outliers" if they are within a block adjacent the current coefficient group, but excludes them otherwise. Reference is now made to FIG. 7, which diagrammatically shows an example 16×16 transform unit 200. Illustrated on the example transform unit 200 are three coefficient groups which are distinguished in the diagram using shading/patterning.

A current coefficient group 201 includes significant-coefficient flags at outlier positions 202 and 203. To determine the context for encoding the significant-coefficient-group flag for coefficient group 201, the encoder/decoder looks at the right neighboring coefficient group 204 and the below neighboring coefficient group 206. In prior example context models, the current context for coefficient group 201 would have been based on the significant-coefficient-group flags for coefficient groups 204 and 206. In particular one example would have assigned a context of 1 to coefficient group 1 if the lower and right significant-coefficient-group flags were both 1 and a context of 0 otherwise. Moreover, aside from context determination, in some embodiments a special case was implemented in which the significant-coefficient-group flag for coefficient group 201 would have been inferred to be 1 (irrespective of whether the coefficient group 201 actually contains a non-zero significant-coefficient flag) if both the lower and right significant-coefficient-group flags were 1.

It will be noted that the lower and right coefficient groups 204, 206 each have outliers that are geometrically separated from the coefficient group 201. In particular outlier 208 (labeled "Y") and outlier 214 (labeled "X") lie in distant parts of the transform unit. As a result, these significant-coefficient flags are not necessarily well correlated to the significant-coefficient flags within the coefficient group 201. Therefore, to the extent that these outliers 208, 214 impact the determination of the significant-coefficient-group flags for coefficient groups 204 and 206, they can have a deleterious impact on the context determination for coefficient group 201 and/or on the efficient use of the special case exception. Accordingly, the context model for determining the significant-coefficient-group flag for coefficient group 201 (and the mechanism for determining the special case) may be modified to better reflect the geometry.

It will be noted that outlier significant-coefficient flags 210 and 212, while separated from their respective coefficient groups 204, 206, are still within the geometric vicinity of the coefficient group 201, since they nest within the other of the neighbor coefficient groups 206, 204, respectively. Therefore, there is no need to exclude consideration of these outlier significant-coefficient flags.

In addition, the significant-coefficient flag at position "Z" 216, which will have been processed during processing of the coefficient group to the right and above the current coefficient group 201, may be worth considering when assessing context of the current coefficient group 201.

If L is defined as the significance (whether there is a non-zero significant-coefficient-flag) of the lower neighboring coefficient group 206, disregarding the significance at position "X" 214; and if R is defined as the significance of the right neighboring coefficient group 204, disregarding the significance at position "Y" 208. Moreover, the significance of position "Z" 216, belonging to an upper right coefficient group, may be used. Using this nomenclature a new context model may be expressed as:

$$C=\min(1,L+R+S\_Z),$$

where C is the context of the current coefficient group for determining its significant-coefficient-group flag, $S\_Z=0$ if we choose not to use position Z and $S\_Z$=significant_coeff_flag of position Z if we do choose to use position Z. If $L+R+S\_Z=2$, we infer significant_coeff-group_flag=1. Otherwise, C=0 or C=1, corresponding to two different contexts respectively. Other variations are possible. For example, three contexts may be defined (0, 1, 2) and no inference may be made.

In a second embodiment, the modified scan order is implemented by maintaining the block-based coefficient groups, but jumping between the groups while processing the significant-coefficient flags in order to avoid data dependencies.

Figure 8:
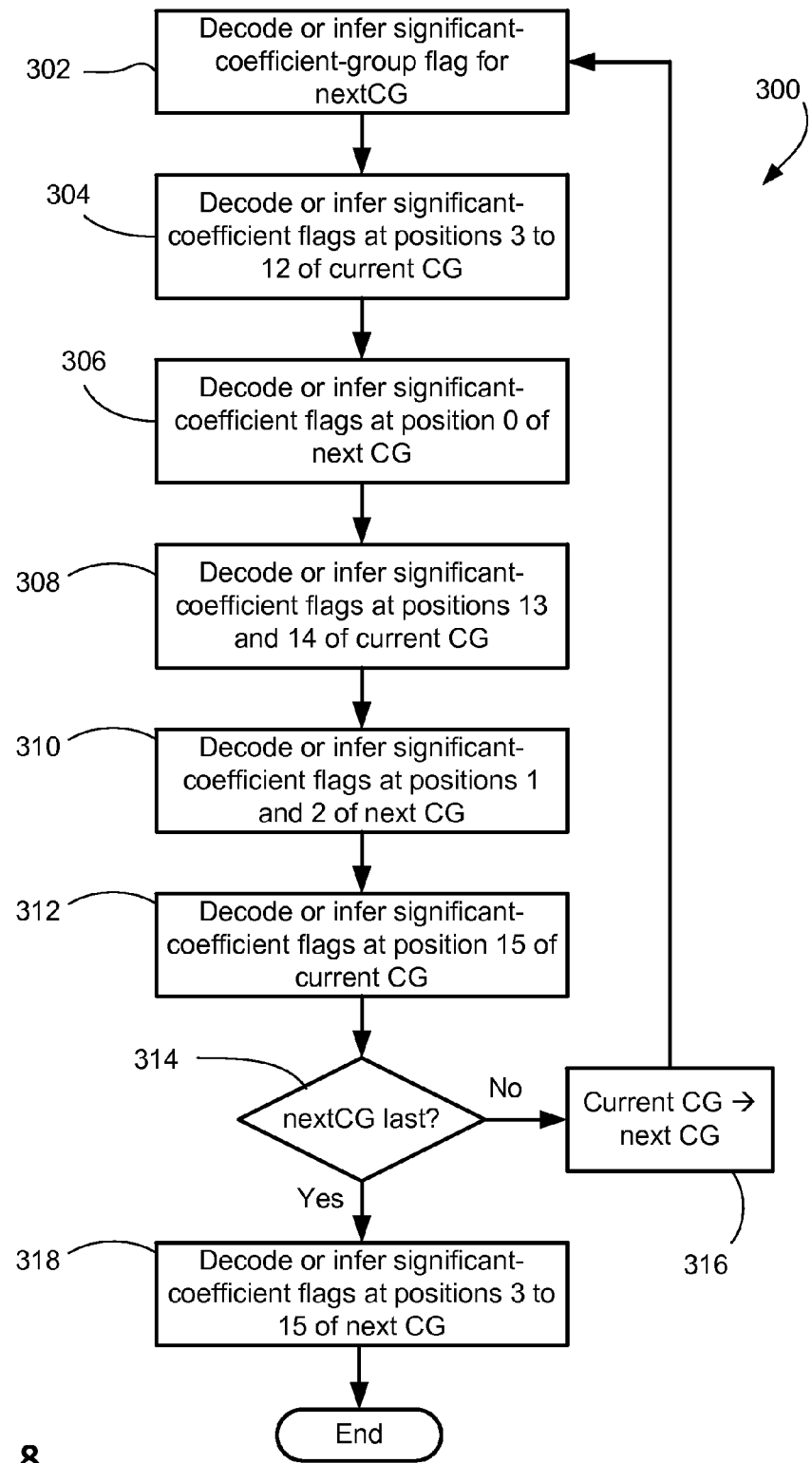
FIG. 8 shows, in flowchart form, an example embodiment of a process for reconstructing significant-coefficient flags.

Reference is now made to FIG. 8, which shows, in flowchart form, a simplified example of a process 300 for decoding a bitstream of encoded significant-coefficient flags in the course of reconstructing video data. It will be appreciated that the encoding process is largely similar. As mentioned above, for the purposes of illustration and explanation, the following indexing or labeling of the positions within a 4×4 block of significant-coefficient flags will be used:

| 15 | 13 | 10 | 6 |
|----|----|----|---|
| 14 | 11 | 7  | 3 |
| 12 | 8  | 4  | 1 |
| 9  | 5  | 2  | 0 |

The exception handling that may occur in the decoding of the coefficient group containing the last significant coefficient is not illustrated in FIG. 8. It will be appreciated that the geometric position of the last significant coefficient within the last coefficient group (the first group to be processed in reverse group-level scan order or sequence), may require special handling. Further details of example special handling are provided later in a discussion of example syntax.

Assume that the decoder is dealing with a "current" coefficient group in the group-level scan order or sequence other than the coefficient group containing the last significant coefficient. In operation 302 of the process 300, the encoder or decoder decodes (or infers) the significant-coefficient-group flag for the next coefficient group. It will be noted that the significant-coefficient-group flag being decoded is for the next coefficient group in the sequence, not the current coefficient group. Accordingly, in this embodiment the significant-coefficient-group flag for a coefficient group is not encoded immediately prior to its significant-coefficient flags (if they are to be encoded), but rather is encoded among the significant-coefficient flags of the preceding coefficient group in the sequence.

It will also be noted that in this embodiment the significant-coefficient-group flag may be inferred in some cases. This addresses the 'special case' in which the significant-coefficient-group flags of the coefficient groups below and to the right are both 1.

Having decoded or inferred the significant-coefficient-group flag for the next coefficient group, in operation 304 the decoder then decodes (or infers, depending on the significant-coefficient-group flag for the current coefficient group) the significant-coefficient flags at positions 3 through 12 of the current coefficient group (may not start with position 3 in some instances, such as within the group containing the last significant coefficient, but that detail is omitted to improve readability of the example process 300).

It will be appreciated that in the process 300, and in the present application in general, when an operation refers to the decoder "decoding or inferring" a significant-coefficient flag, the intended meaning is that the decoding process is initiated. It is not necessarily completed before the next operation. The context determination for a flag may be completed in one cycle and in a next cycle the context determination for the subsequent flag may be initiated even though the BAC decoding and context update for the previous significant-coefficient flag is not yet complete.

In operation 306 the decoder then decodes or infers the significant-coefficient flag at position 0 of the next coefficient group. The next coefficient group is the coefficient group immediately after the current coefficient group in the group-level scan order or sequence. It will be recalled that in operation 302 the significant-coefficient-group flag for the next coefficient group was decoded. Thus the decoder is able to determine whether to decode or infer the significant-coefficient flag at position 0 of that next coefficient group.

In operation 308, the decoder then returns to the current coefficient group to decode or infer the significant-coefficient flags at positions 13 and 14 of the current coefficient group. In operation 310, the decoder decodes or infers the significant-coefficient flag at positions 1 and 2 of the next coefficient group. Then in operation 312 the decoder decodes or infers the significant-coefficient flag at position 15 of the current coefficient group.

The decoder then assesses whether the next coefficient group is the last coefficient group in the sequence or not in operation 314. If it is the last coefficient group, then the decoder goes on to decode or infer the remaining significant-coefficient flags for positions 3 to 15 of that last coefficient group in operation 318. No stall of the BAC engine will result since the context for the flags in the upper-left positions of that coefficient group are dependent upon the position and not the neighboring flags.

If the next coefficient group is not the last coefficient group, then in operation 316 the decoder increments a coefficient group index such that the next coefficient group now become the current coefficient group and it returns to operation 302 to continue the decoding process 300.

Another description of the encoding/decoding process of this embodiment is set out below, in which the current coefficient group is denoted C and the next coefficient group in the sequence of coefficient groups is denoted N. The below process uses a notion of "TrueLast" for special handling of the case where the last significant-coefficient flag (i.e. the first flag to be processed in the transform unit in reverse scan order from the last significant coefficient) is in the $15^{th}$, $14^{th}$, or $13^{th}$ position. The example process is as follows:

1. Initialization: start encoding (decoding) at the position before the last non-zero transform coefficient.
2. Find the next coefficient group in the sequence and denote it N. If N exists (i.e. C is not the upper left coefficient group), encode (decode) the significant-coefficient-group flag of N.
3. Encode (decode) or infer the significant-coefficient flags in the current coefficient group C in reverse scan order, starting at the first significant-coefficient flag in C that has not been encoded (decoded) or inferred, denoted as trueLast, until position 13 is reached. If N does not exist, go to Step 5.
4. Encode (decode) or infer the significant-coefficient flag at position 0 in N.
5. If trueLast<=13, encode (decode) the significant-coefficient flag at position 13 in C.
6. If trueLast<=14, encode (decode) the significant-coefficient flag at position 14 in C. If N does not exist, go to Step 8.
7. Encode (decode) or infer the significant-coefficient flags at positions 1 and 2 in N.
8. Encode (decode) or infer the significant-coefficient flag at position 15 in C.
9. If N exists, set C=N and go to Step 2. Otherwise, stop.

An example syntax for implementing multi-level significance maps is provided below. This example syntax is but one possible implementation.

In the syntax exemplified by the pseudo-code below, if the transform unit size is 16×16 or 32×32 (e.g. log 2(TrafoSize) >3), then the example process is performed. It will be noted that the example syntax uses the concepts of a trueLastOffset and a virtualLastOffset to handle the exceptions and special cases that may occur when applying the modified scan order to the coefficient group containing the last significant coefficient.

The following pseudo-code illustrates one example implementation of a modified scan order within the decoding process for reconstruction of significant-coefficient flags.

| residual_coding_cabac( x0, y0, log2TrafoSize, trafoDepth, scanIdx, cIdx ) { | Descriptor |
|---|---|
|     last_significant_coeff_x | ae(v) |
|     last_significant_coeff_y | ae(v) |
|     numCoeff = 0 | |
|     xC = ScanOrder[ log2TrafoSize − 2 ][ log2TrafoSize − 2 ][ scanIdx ][ numCoeff ][ 0 ] | |
|     yC = ScanOrder[ log2TrafoSize − 2 ][ log2TrafoSize − 2 ][ scanIdx ][ numCoeff ][ 1 ] | |
|     while( ( xC != last_significant_coeff_x ) || ( yC != last_significant_coeff_y ) ) { | |
|         numCoeff++ | |
|         xC = ScanOrder[ log2TrafoSize − 2 ][ log2TrafoSize − 2 ][ scanIdx ][ numCoeff ][ 0 ] | |
|         yC = ScanOrder[ log2TrafoSize − 2 ][ log2TrafoSize − 2 ][ scanIdx ][ numCoeff ][ 1 ] | |
|     } | |
|     if (log2TrafoSize > 3) { | |
|         numCoeffGroup = ((numCoeff + 15) *16) >> 4 | |
|         trueLastOffset = numCoeff − ((numCoeffGroup − 1) * 16) − 1 | |
|         virtualLastOffset = trueLastOffset < 2 ? 2 : trueLastOffset | |

-continued

| residual_coding_cabac( x0, y0, log2TrafoSize, trafoDepth, scanIdx, cIdx ) { | Descriptor |
|---|---|

```
        numNonZeroesInCG = 1
        inferredCGFlag = false
        for (nCG = numCoeffGroup - 1; nCG >= 0; nCG--) {
            numNonZeroesInNextCG = 0
            inferredNextCGFlag = false
            xCG = ScanOrder[ log2trafoSize - 4 ][ log2trafoSize - 4 ][ scanIdx ][ nCG ][ 0 ]
            yCG = ScanOrder[ log2trafoSize - 4 ][ log2trafoSize - 4 ][ scanIdx ][ nCG ][ 1 ]
            xNextCG = ScanOrder[ log2trafoSize - 4 ][ log2trafoSize - 4 ][ scanIdx ][ nCG - 1 ][ 0 ]
            yNextCG = ScanOrder[ log2trafoSize - 4 ][ log2trafoSize - 4 ][ scanIdx ][ nCG - 1 ][ 1 ]
            sigStartOffset = (nCG == numCoeffGroup-1 ? virtualLastOffset : 12)
            if (nCG == numCoeffGroup-1 || nCG == 0) {
                significant_coeffgroup_flag[ xCG ][ yCG ] = 1
            }
            if (nCG > 0) {
                rightCGFlag = (xNextCG == (1<< (log2trafoSize - 2 ) ) - 1)? 0: significant_coeffgroup_flag[
xNextCG+1][ yNextCG ]
                bottomCGFlag = (yNextCG == (1 << (log2trafoSize - 2 ) ) - 1)? 0: significant_coeffgroup_flag[
xNextCG ] [ yNextCG+1 ]
                if ( rightCGFlag + bottomCGFlag != 2 ) {
                    significant_coeffgroup_flag[ xNextCG ][ yNextCG ]                                           ae(v)
                } else {
                    significant_coeffgroup_flag[ xNextCG ][ yNextCG ] = 1
                    inferredNextCGFlag = true
                }
            }
            for ( m = sigStartOffset ; m >= 0; m-- ) {
                if (nCG > 0 && (m == 2 || m == 0) {
                    coeffsInNextCG = (m == 0 ? 2 : 1)
                    coeffIdxInNextCG = (m == 0 ? (nCG - 1)*16 + 14 : (nCG - 1)*16 + 15)
                    for (j = 0; j < coeffsInNextCG; j++) {
                        xC = ScanOrder[ log2TrafoSize - 2 ][ log2TrafoSize - 2 ][ scanIdx ][ coeffIdxInNextCG - j
][ 0 ]
                        yC = ScanOrder[ log2TrafoSize - 2 ][ log2TrafoSize - 2 ][ scanIdx ][ coeffIdxInNextCG - j
][ 1 ]
                        significant_coeff_flag[ xC ] [ yC ] = 0
                        if (significant_coeffgroup_flag[ xNextCG ][ yNextCG ] ) {
                            significant_coeff_flag[ xC ][ yC ]                                                  ae(v)
                            numNonZeroesInNextCG += significant_coeff_flag[ xC ][ yC ]
                        }
                    }
                }
                xC = ScanOrder[ log2TrafoSize - 2 ][ log2TrafoSize - 2 ][ scanIdx ][ nCG*16 + m ][ 0 ]
                yC = ScanOrder[ log2TrafoSize - 2 ][ log2TrafoSize - 2 ][ scanIdx ][ nCG*16 + m ][ 1 ]
                if (significant_coeffgroup_flag[ xCG ][ yCG ] ) {
                    if ( !(nCG == numCoeffGroup - 1 && m >= trueLastOffset) ) {
                        if (m > 0 || inferredCGFlag || numNonZeroesInCG) {
                            significant_coeff_flag[ xC ][ yC ]                                                  ae(v)
                            numNonZeroesInCG += significant_coeff_flag[ xC ][ yC ]
                        } else {
                            significant_coeff_flag[ xC ] [ yC ] = 1
                        }
                    }
                } else {
                    significant_coeff_flag[ xC ][ yC ] = 0
                }
            }
            inferredCGFlag = inferredNextCGFlag
            numNonZeroesInCG = numNonZeroesInNextCG
        }
    } else {
        for( n = numCoeff - 1 ; n >= 0; n-- ) {
            xC = ScanOrder[ log2TrafoSize - 2 ][ log2TrafoSize - 2 ][ scanIdx ][ n ][ 0 ]
            yC = ScanOrder[ log2TrafoSize - 2 ][ log2TrafoSize - 2 ][ scanIdx ][ n ][ 1 ]
            significant_coeff_flag[ xC ][ yC ]                                                                  ae(v)
        }
    }
    ....(decoding of coefficient values and signs omitted)
}
```

60

In yet a third embodiment, the process of the second embodiment may be modified such that the encoding of flags from the 'next' coefficient group is based on locating a 'next' coefficient group for which the significant-coefficient-group flag=1. That is, when looking ahead to encode a significant-flag for position 0 in the next coefficient group, the encoder/decoder looks for the next coefficient group that will actually have significant-coefficient flags to encode, rather than one for which the flags may be inferred.

Figure 9:
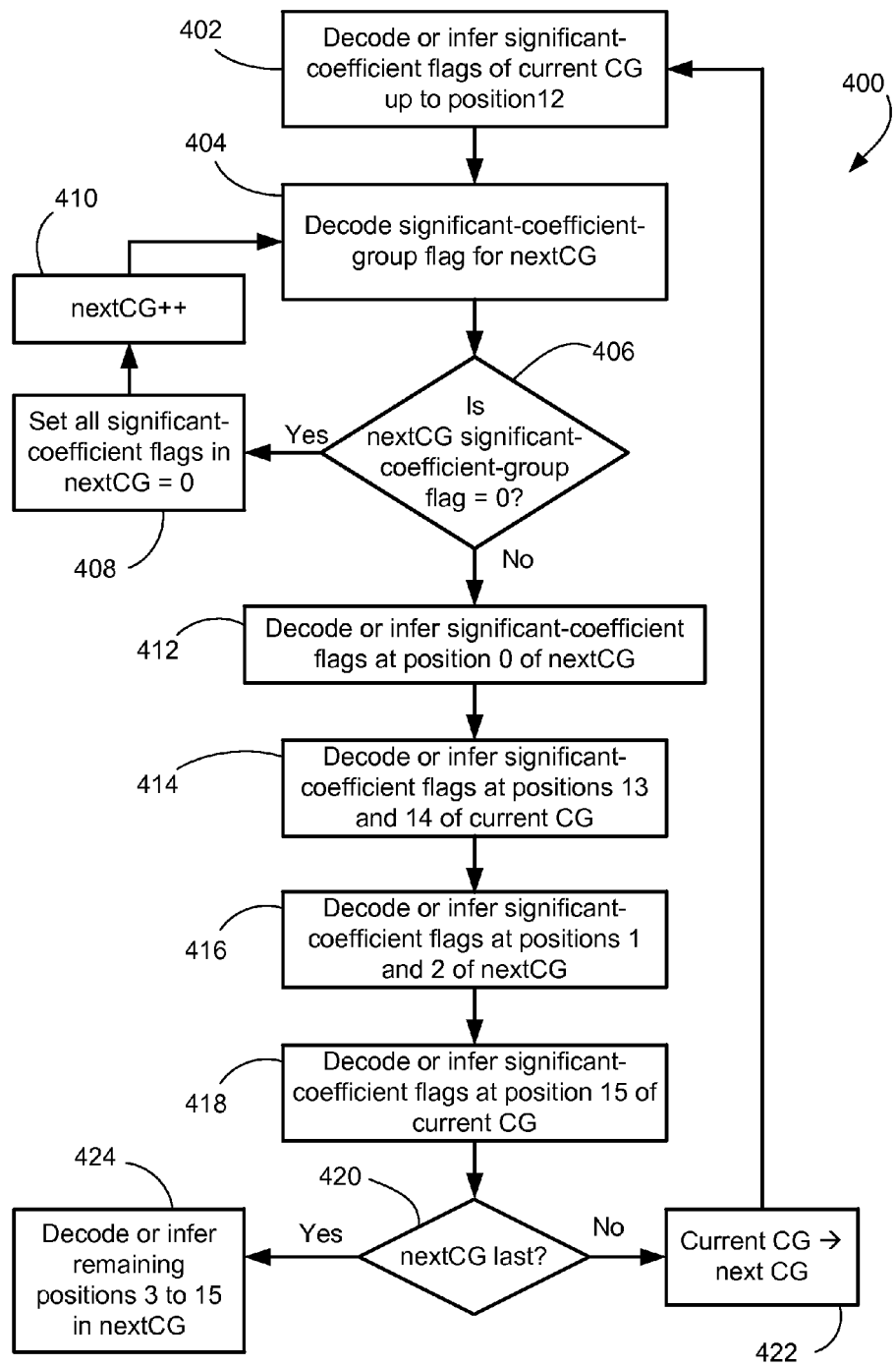
FIG. 9 shows, in flowchart form, another example embodiment of a process for reconstructing significant-coefficient flags.

A simplified example process 400 illustrating the third embodiment is shown in flowchart form in FIG. 9. As was the case with FIG. 8, some of the exception and special case handling for starting the process 400 in the coefficient group containing the last significant coefficient is not shown in FIG.

9. FIG. 9 shows at least a portion of this example process of reconstructing the significant-coefficient flags for a transform unit from the encoded data of a bitstream. It bears repeating that the operation of "decoding or inferring" is intended to mean that the decoding process is started, but not necessarily completed before the next operation.

The process 400 is presumed to be operating on a current coefficient group, i.e. set of significant-coefficient flags. The process 400 includes an operation 402 of decoding or inferring the values of the significant-coefficient flags for positions 3 through 12 of the current coefficient group. Once the decoder reaches position 12, the decoder then decodes a significant-coefficient-group flag for the next coefficient group in the group-level scan order or sequence, as shown by operation 404. Denote the next coefficient group in the sequence as nextCG.

If the decoded (or inferred) significant-coefficient-group flag for the next coefficient group nextCG is equal to 0, then in operation 408 all the significant-coefficient flags of that next coefficient group are set to zero, and the decoder increments the nextCG to the next group in the sequence in operation 410. It then returns to operation 404 to decode the significant-coefficient-group flag for that nextCG. This continues until the decoder decodes or infers a significant-coefficient-group flag that is equal to 1.

Once the decoder obtains a significant-coefficient-group flag=1, the decoder advances to operation 412 to decode or infer the significant-coefficient flag at position 0 within that nextCG. In operation 414, the decoder decodes or infers the significant-coefficient flags at positions 13 and 14 of the current coefficient group. In operation 416, the significant-coefficient flags at positions 1 and 2 of the nextCG are decoded or inferred. Then in operation 418 the significant-coefficient flag at position 15 of the current coefficient group is decoded or inferred.

The decoder then assesses whether the nextCG is the last coefficient group in the sequence, i.e. whether it is the upper-left group in the transform unit. If not, then in operation 422, the current coefficient group is set to be the nextCG and the decoder returns to operation 402 to continue reconstruction. If it is the last group, then in operation 424 the decoder completes the reconstruction by decoding or inferring the significant-coefficient flags at positions 3 through 15 of the nextCG (the upper-left group in the transform unit).

It will be appreciated that this process interleaves the decoding/encoding/inferring of significant-coefficient flags between coefficient groups having a significant-coefficient-group flag=1, and which are (in the absence of those groups that are inferred, i.e. that have a significant-coefficient-group flag=0) adjacent each other in the sequence or group-level scan order.

Figure 10:
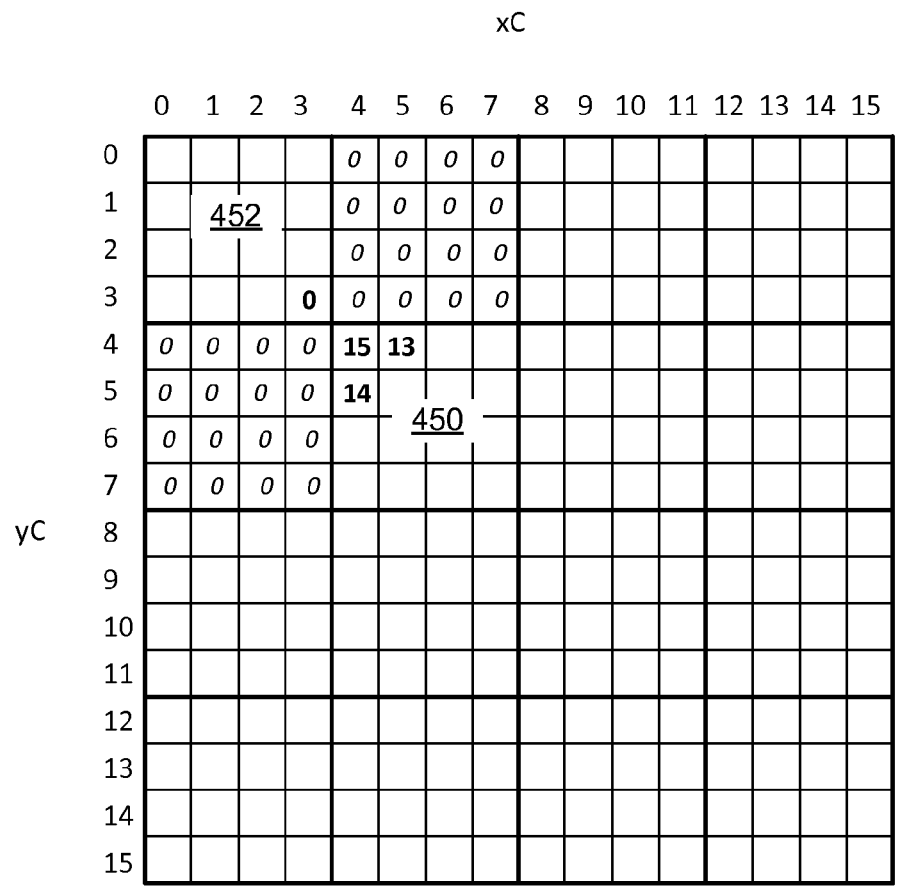
FIG. 10 shows a special case to be handled in at least one embodiment of the process for reconstructing significant-coefficient flags.

This embodiment introduces an anomalous special case that should be handled. FIG. 10 illustrates a situation in which the current coefficient group 450 is to the immediate right and immediately below the next coefficient group 452 (nextCG), i.e. in which position 0 of the nextCG 452 is diagonally adjacent position 15 of the current coefficient group 450. It will be noted that the coefficient groups between the current coefficient group 450 and the nextCG 452 in the sequence contain all zero significant-coefficient flags.

In this situation, the modified scan order would result in the encoding of position 0 of the nextCG 452 before the encoding of positions 13, 14 or 15 from the current coefficient group 450. As a result, those values (13, 14, and 15) are unavailable for context modeling at the time of the encoding of position 0.

In this special case, the encoding of position 0 in nextCG 452 before encoding positions 13 and 14 may be skipped and performed in a conventional scan order. Similarly, in some implementations in this special case the encoding of positions 1 and 2 prior to encoding position 15 may be skipped and performed in a conventional scan order. This will result in under-utilization of the BAC engine in this specific instance.

In another embodiment, this special situation may be addressed by using a modified context model for this specific instance. For example, the modified context model for encoding position 0 could be structured to exclude position 15 as an element of the model:

| x | o | o | |
|---|---|---|---|
| o |   |   | |
| o |   |   | |
|   |   |   | |

Another description of the encoding/decoding process of this third embodiment of the modified scan order is set out below, in which the current coefficient group is denoted C and the next coefficient group in the sequence of coefficient groups is denoted N. The below process uses a notion of "TrueLast" for special handling of the case where the last significant-coefficient flag (i.e. the first flag to be processed in the transform unit in reverse scan order from the last significant coefficient) is in the $15^{th}$, $14^{th}$, or $13^{th}$ position. The example process is as follows:

1. Initialization: start decoding significant-coefficient flags at the position before the last non-zero transform coefficient.
2. Decode the significant-coefficient flags in the current coefficient group C in reverse scan order, starting at the first significant-coefficient flag in C that has not been decoded, denoted as trueLast, until position 13 is reached.
3. Find the next coefficient group, in reverse scan order and denote it N. If no such coefficient group N exists, go to Step 6.
4. Decode N's significant-coefficient-group flag. If N's significant-coefficient-group flag=0, set significant-coefficient flag=0 for all positions in N and go back to Step 3.
5. Decode the significant-coefficient flag at position 0 in N.
6. If trueLast<=13, decode the significant-coefficient flag at position 13 in C.
7. If trueLast<=14, decode the significant-coefficient flag at position 14 in C. If N does not exist, go to Step 9.
8. Decode the significant-coefficient flag at positions 1 and 2 in N.
9. Decode or infer the significant-coefficient flag at position 15 in C.
10. If N exists, set C=N and go to Step 2. Otherwise, stop.

An example syntax for implementing this third embodiment is provided below. This example syntax is but one possible implementation. The following pseudo-code illustrates one example implementation of a modified scan order within the decoding process for reconstruction of significant-coefficient flags.

| | Descriptor |
|---|---|
| residual_coding_cabac( x0, y0, log2TrafoSize, trafoDepth, scanIdx, cIdx ) { | |
|     last_significant_coeff_x | ae(v) |
|     last_significant_coeff_y | ae(v) |
|     numCoeff = 0 | |
|     xC = ScanOrder[ log2TrafoSize − 2 ][ log2TrafoSize − 2 ][ scanIdx ][ numCoeff ][ 0 ] | |
|     yC = ScanOrder[ log2TrafoSize − 2 ][ log2TrafoSize − 2 ][ scanIdx ][ numCoeff ][ 1 ] | |
|     while( ( xC != last_significant_coeff_x ) || ( yC != last_significant_coeff_y ) ) { | |
|         numCoeff++ | |
|         xC = ScanOrder[ log2TrafoSize − 2 ][ log2TrafoSize − 2 ][ scanIdx ][ numCoeff ][ 0 ] | |
|         yC = ScanOrder[ log2TrafoSize − 2 ][ log2TrafoSize − 2 ][ scanIdx ][ numCoeff ][ 1 ] | |
|     } | |
|     if (log2TrafoSize > 3) { | |
|         CGSize = 16 | |
|         numCoeffGroup = ((numCoeff + CGSize − 1) *CGSize) >> 4 | |
|         trueLastOffset = numCoeff − ((numCoeffGroup − 1) * CGSize) − 1 | |
|         virtualLastOffset = trueLastOffset < 2 ? 2 : trueLastOffset | |
|         nCG = numCoeffGroup − 1 | |
|         dependency = false | |
|         significant_coeffgroup_flag[ 0 ][ 0 ] = 1 | |
|         numNonZeroesInCG = 1 | |
|         inferredCGFlag = false | |
|         while (nCG >= 0) { | |
|             numNonZeroesInNextCG = 0 | |
|             inferredNextCGFlag = false | |
|             nNextCG = nCG | |
|             xCG = ScanOrder[ log2trafoSize − 4 ][ log2trafoSize − 4 ][ scanIdx ][ nCG ][ 0] | |
|             yCG = ScanOrder[ log2trafoSize − 4 ][ log2trafoSize − 4 ][ scanIdx ][ nCG ][ 1] | |
|             if (nCG == numCoeffGroup−1) { | |
|                 significant_coeffgroup_flag[ xCG ][ yCG ] = 1 | |
|                 sigStartOffset = virtualLastOffset | |
|             } else if (dependency) { | |
|                 sigStartOffset = CGSize − 1 | |
|             } else { | |
|                 sigStartOffset = CGSize − 4 | |
|             } | |
|             dependency = false | |
|             for ( m = sigStartOffset ; m >= 0; m−− ) { | |
|                 if(m == 2){ | |
|                     nNextCG = nCG − 1 | |
|                     while ( nNextCG >= 0) { | |
|                         xNextCG = ScanOrder[ log2trafoSize − 4 ][ log2trafoSize − 4 ][ scanIdx ][ nNextCG ][ 0] | |
|                         yNextCG = ScanOrder[ log2trafoSize − 4 ][ log2trafoSize − 4 ][ scanIdx ][ nNextCG ][ 1] | |
|                         rightCGFlag = (xNextCG == (1<< (log2trafoSize − 2 ) ) − 1)? 0 : significant_coeffgroup_flag[ xNextCG+1 ][ yNextCG ] | |
|                         bottomCGFlag = (yNextCG == (1 << (log2trafoSize − 2 ) ) − 1)? 0: significant_coeffgroup_flag[ xNextCG ] [ yNextCG+1 ] | |
|                         if ( rightCGFlag + bottomCGFlag != 2 ) { | |
|                             significant coeffgroup flag[ xNextCG ][ yNextCG ] | ae(v) |
|                         } else { | |
|                             significant_coeffgroup_flag[ xNextCG ][ yNextCG ] = 1 | |
|                             inferredNextCGFlag = true | |
|                         } | |
|                         if (significant_coeffgroup_flag[ xNextCG ][ yNextCG ] ) { | |
|                             dependency = (xNextCG == xCG − 1 && yNextCG == yCG − 1) | |
|                             if (!dependency) { | |
|                                 n = nNextCG*CGSize + CGSize − 1 | |
|                                 xC = ScanOrder[ log2TrafoSize − 2 ][ log2TrafoSize − 2 ][ scanIdx ][ n ][ 0 ] | |
|                                 yC = ScanOrder[ log2TrafoSize − 2 ][ log2TrafoSize − 2 ][ scanIdx ][ n ][ 1 ] | |
|                                 significant coeff_flag[ xC ][ yC ] | ae(v) |
|                                 numNonZeroesInNextCG += significant_coeff_flag[ xC ] [ yC ] | |
|                                 sigStartOffset = CGSize − 4 | |
|                             } | |
|                             Break out of while ( nNextCG >= 0) | |
|                         } else{ | |
|                             for(j = CGSize −1; j >= 0; j −−) { | |
|                                 n = nCG*CGSize + j | |
|                                 xC = ScanOrder[ log2TrafoSize − 2 ][ log2TrafoSize − 2 ][ scanIdx ][ n ][ 0 ] | |
|                                 yC = ScanOrder[ log2TrafoSize − 2 ][ log2TrafoSize − 2 ][ scanIdx ][ n ][ 1 ] | |
|                                 significant_coeff_flag[ xC ][ yC ] = 0 | |
|                             } | |
|                         nNextCG−− | |
|                       } | |
|                   } | |
|               } else if (m == 0 && nCG > 0) { | |
|                   if (!dependency) { | |
|                       for (j = 1; j <= 2; j++) { | |
|                           n = nNextCG*CGSize + CGSize − 1 − j | |
|                           xC = ScanOrder[ log2TrafoSize − 2 ][ log2TrafoSize − 2 ][ scanIdx ][ n ][ 0 ] | |

-continued

```
residual_coding_cabac( x0, y0, log2TrafoSize, trafoDepth, scanIdx, cIdx ) {                             Descriptor
                    yC = ScanOrder[ log2TrafoSize – 2 ][ log2TrafoSize – 2 ][ scanIdx ][ n ][ 1 ]
                    significant_coeff_flag[ xC ][ yC ]                                                  ae(v)
                    numNonZeroesInNextCG += significant_coeff_flag[ xC ][ yC ]
                }
            }
        }
        if ( !(nCG == numCoeffGroup – 1 && m >= trueLastOffset) ) {
            if (m > 0 || inferredCGFlag || numNonZeroesInCG) {
                n = nCG*CGSize + m
                xC = ScanOrder[ log2TrafoSize – 2 ][ log2TrafoSize – 2 ][ scanIdx ][ n ][ 0 ]
                yC = ScanOrder[ log2TrafoSize – 2 ][ log2TrafoSize – 2 ][ scanIdx ][ n ][ 1 ]
                significant_coeff_flag[ xC ][ yC ]                                                      ae(v)
                numNonZeroesInCG += significant_coeff_flag[ xC ][ yC ]
            } else {
                significant_coeff_flag[ xC ][ yC ] = 1
            }
        }
    }
    inferredCGFlag = inferredNextCGFlag
    numNonZeroesInCG = numNonZeroesInNextCG
    nCG = nNextCG
    }
} else {
    for( n = numCoeff – 1; n >= 0; n-- ) {
        xC = ScanOrder[ log2TrafoSize – 2 ][ log2TrafoSize – 2 ][ scanIdx ][ n ][ 0 ]
        yC = ScanOrder[ log2TrafoSize – 2 ][ log2TrafoSize – 2 ][ scanIdx ][ n ][ 1 ]
        significant_coeff_flag[ xC ][ yC ]                                                              ae(v)
    }
}
```

....(decoding of coefficient values and signs omitted)
}

In yet a further aspect, the BAC engine stall issue may be addressed through modifications to the context model instead of, or in addition to, modifications to the scan order. For example, the significant-coefficient flags that make up the "neighborhood" for context determination may be varied depending upon the position within the block or coefficient-group. The conventional or usual context model that is currently in use for determining context for most significant-coefficient flags based upon their neighbors looks as follows:

x o o o o o where x is the significant-coefficient flag for which context is being determined and 'o' marks the adjacent significant-coefficient flags used in the context determination. As mentioned previously, BAC engine pipeline stalls occur when this model is applied to a diagonal scan within a 4×4 block. Specifically, positions 1, 2, 3, 4, 13, 14 and 15 have data dependencies that prevent full pipelining because their context relies upon a neighbor that is not fully processed by the BAC engine by the time that position is reached for processing. Accordingly, in one embodiment, the context model for these positions may be modified to avoid these dependencies.

As one example, consider positions 4 and 15, which under the above context model are stalled because the adjacent neighbors to the right and below are unavailable. The significant-coefficient flags at these two positions could use a context neighborhood of the form:

x    o o o o o thereby avoiding use of the two problematic adjacent significant-coefficient flags.

Similarly, positions 1, 3, 13 and 14 may avoid the problem of an unavailable neighbor immediately below them by using a context neighborhood such as:

x o o o o o

Position 2 could use a context neighborhood of the form:

x       o o o o o

Speculative execution is used when consecutive bins share the same context.

In one embodiment, all of positions 0, 1, 2, 3 and 4 are given the same context and speculative execution is used.

It will be understood that the foregoing context neighborhoods are examples and that, more generally, the neighborhood used for context derivation may be modified to apply different neighborhoods to flags in different positions within the coefficient group so as to avoid data dependencies in a pipelined BAC engine.

Figure 11:
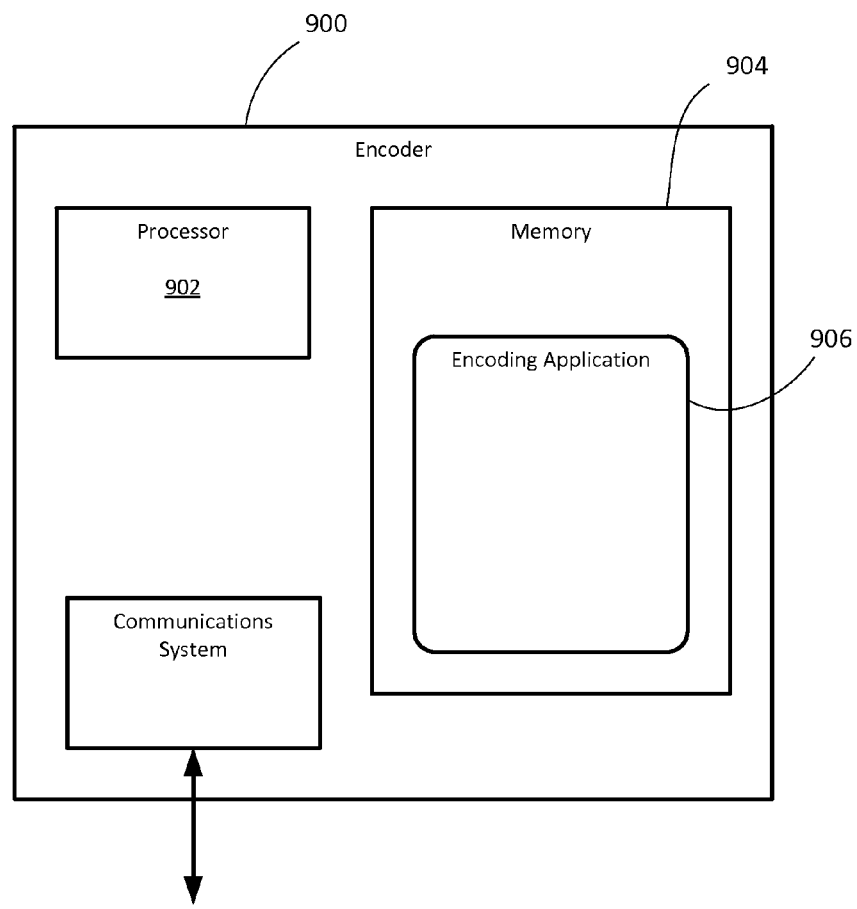
FIG. 11 shows a simplified block diagram of an example embodiment of an encoder.

Reference is now made to FIG. 11, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the processes described herein. It will be understood that the encoding application 906 may be stored in on a computer readable medium, such as a compact disc, flash memory device, random access memory, hard drive, etc.

Figure 12:
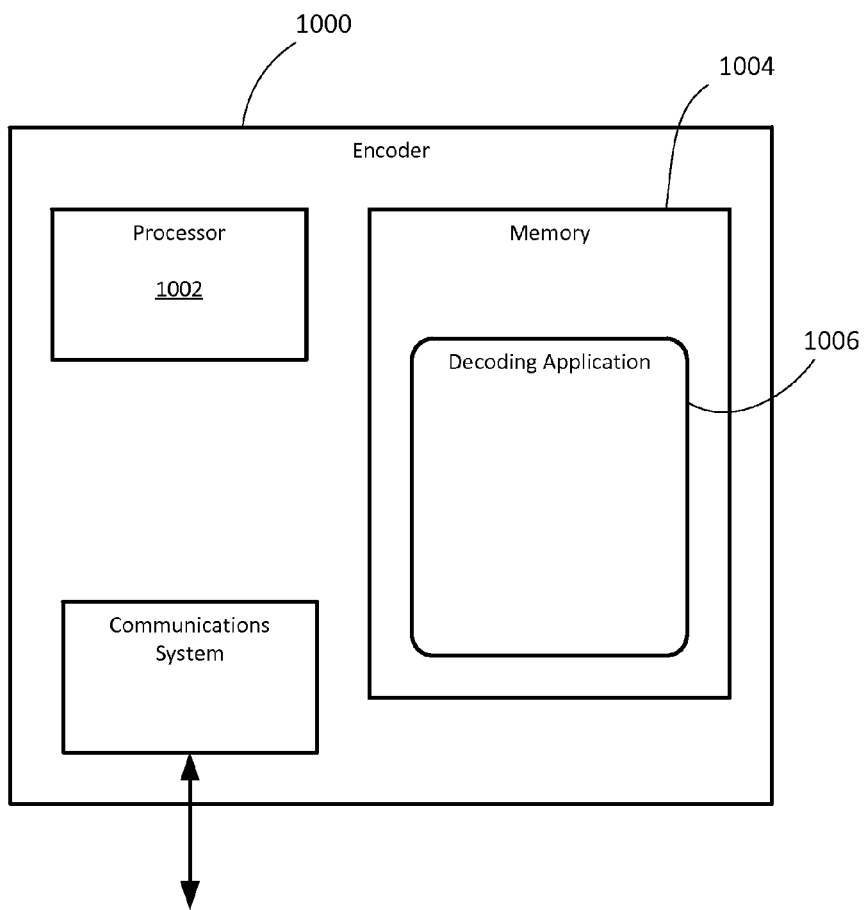
FIG. 12 shows a simplified block diagram of an example embodiment of a decoder.

Reference is now also made to FIG. 12, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. The decoding application 1006 may include an entropy decoder configured to reconstruct residuals based, at least in part, on reconstructing significant-coefficient flags, as described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of decoding a bitstream of encoded video by reconstructing significant-coefficient flags for a transform unit, the transform unit comprising a sequence of blocks, the bitstream including sets of significant-coefficient flags, each set corresponding to a respective block, the method comprising:
    for each set of significant-coefficient flags, decoding that set in a scan order, wherein the scan order is a diagonal scan within its respective block modified so as to
        decode a significant-coefficient flag in the bottom-right-corner position within the respective block corresponding to the set, prior to decoding at least two significant-coefficient flags of a previous set in the sequence, and
        decode a significant-coefficient flag in the upper-left-corner position within that respective block, after decoding at least two significant-coefficient flags of a subsequent set in the sequence.

2. The method claimed in claim 1, wherein decoding that set in the scan order comprises:
    decoding all the significant-coefficient flags in the set except significant-coefficient flags in the three last positions located in the upper-left corner in the block-based diagonal scan;
    decoding a significant-coefficient flag in the lower-right position of the subsequent set; and
    decoding significant-coefficient flags in a third-to-last position and a second-to-last position in the block-based diagonal scan of the set,
    and wherein the diagonal scan is a reverse diagonal scan order.

3. The method claimed in claim 2, wherein decoding that set in the scan order further comprises then decoding significant-coefficient flags in a second position and a third position in the block-based diagonal scan of the subsequent set, and decoding the significant-coefficient flag in the upper-right position in the set.

4. The method claimed in claim 1, wherein that subsequent set comprises the next set in the sequence for which an associated significant-coefficient-group flag is equal to one.

5. The method of claim 1, wherein decoding of a significant-coefficient flag comprises determining a context for the significant-coefficient flag.

6. The method of claim 5, wherein decoding further comprises:
    binary arithmetically decoding a value for the significant-coefficient flag based on the determined context;
    and wherein the decoding of the significant-coefficient flag in the bottom-right position within the respective block corresponding to the set comprises determining a context for the significant-coefficient flag in the bottom-right position within that respective block prior to determining a respective context for the at least two significant-coefficient flags of the previous set,
    and wherein the decoding of a significant-coefficient flag in the upper-left position within that respective block comprises determining a context for the significant-coefficient flag in the upper-left position within that respective block after determining a respective context for the at least two significant-coefficient flags of the subsequent set.

7. The method claimed in claim 1, wherein decoding a significant-coefficient flag comprises determining a context for the significant-coefficient flag, and either
    binary arithmetically decoding a value for the significant-coefficient flag from the encoded data of the bitstream, or
    inferring the value for the significant-coefficient flag.

8. A method of decoding a bitstream of encoded video by reconstructing significant-coefficient flags for a transform unit, the transform unit comprising a sequence of blocks, the bitstream including sets of significant-coefficient flags, each set corresponding to a respective block, the bitstream sequencing the sets according to the order of their corresponding blocks, the bitstream encoding the significant-coefficient flags of each set in a scan order, the method comprising:
    for each set of significant-coefficient flags, decoding that set in the scan order, wherein the scan order is a modification of a block-based diagonal scan, modified to exclude a bottom-right-corner position within the block corresponding to the set and an upper-left-corner position within that block and modified to include an upper-left-corner location in a previous block and a bottom-right-corner location in a next block.

9. The method of claim 8, wherein decoding of a significant-coefficient flag comprises determining a context for the significant-coefficient flag.

10. The method of claim 8, wherein the blocks are 4×4 and wherein each set includes fourteen significant-coefficient flags from its corresponding block and includes a significant-coefficient flag from the upper-left location in the previous block and includes a significant-coefficient flag from the bottom-right location in the next block.

11. The method of claim 8, wherein the previous block is the immediately preceding block in the sequence, and wherein the next block is the immediately following block in the sequence.

12. A decoder for decoding a bitstream of encoded data to reconstruct significant-coefficient flags for a transform unit, the transform unit comprising a sequence of blocks, the bitstream including sets of significant-coefficient flags, each set corresponding to a respective block, the decoder comprising:
processing circuitry to, for each set of significant-coefficient flags,
decode that set in a scan order, wherein the scan order is a diagonal scan within its respective block modified so as to
decode a significant-coefficient flag in the bottom-right-corner position within the respective block corresponding to the set, prior to decoding at least two significant-coefficient flags of a previous set in the sequence, and
decode a significant-coefficient flag in the upper-left-corner position within that respective block, after decoding at least two significant-coefficient flags of a subsequent set in the sequence.

13. The decoder claimed in claim 12, wherein the processing circuitry is to decode that set in the scan order by
decoding all the significant-coefficient flags in the set except significant-coefficient flags in the three last positions located in the upper-left corner in the block-based diagonal scan;
decoding a significant-coefficient flag in the lower-right position of the subsequent set; and
decoding significant-coefficient flags in a third last position and a second last position in the block-based diagonal scan of the set.

14. The decoder claimed in claim 13, wherein the processing circuitry is to then decode significant-coefficient flags in a second position and a third position in the block-based diagonal scan of the subsequent set, and to decode the significant-coefficient flag in the upper-right position in the set.

15. The decoder claimed in claim 12, wherein that subsequent set comprises the next set in the sequence for which an associated significant-coefficient-group flag is equal to one.

16. The decoder claimed in claim 12, wherein the processing circuitry is to decode a significant-coefficient flag by determining a context for the significant-coefficient flag.

17. The decoder claimed in claim 16, wherein the processing circuitry is to decode the significant-coefficient flag by:
binary arithmetically decoding a value for the significant-coefficient flag based on the determined context;
and wherein the decoding of the significant-coefficient flag in the bottom-right position within the respective block corresponding to the set comprises determining a context for the significant-coefficient flag in the bottom-right position within that respective block prior to determining a respective context for the at least two significant-coefficient flags of the previous set,
and wherein the decoding of a significant-coefficient flag in the upper-left position within that respective block comprises determining a context for the significant-coefficient flag in the upper-left position within that respective block after determining a respective context for the at least two significant-coefficient flags of the subsequent set.

18. The decoder claimed in claim 12, wherein the processing circuitry is to decode a significant-coefficient flag by determining a context for the significant-coefficient flag, and either
binary arithmetically decoding a value for the significant-coefficient flag from the encoded data of the bitstream, or
inferring the value for the significant-coefficient flag.

19. A decoder for decoding a bitstream of encoded data to reconstruct significant-coefficient flags for a transform unit, the transform unit comprising a sequence of blocks, the bitstream including sets of significant-coefficient flags, each set corresponding to a respective block, the bitstream sequencing the sets according to the order of their corresponding blocks, the bitstream encoding the significant-coefficient flags of each set in a scan order, the decoder comprising:
processing circuitry to, for each set of significant-coefficient flags,
decode that set in the scan order, wherein the scan order is a modification of a block-based diagonal scan, modified to exclude a bottom-right-corner position within the block corresponding to the set and an upper-left-corner position within that block and modified to include an upper-left-corner location in a previous block and a bottom-right-corner location in a next block.

20. A non-transitory processor-readable medium storing processor-executable instructions which, when executed, configures one or more processors to reconstruct significant-coefficient flags for a transform unit, the transform unit comprising a sequence of blocks, the bitstream including sets of significant-coefficient flags, each set corresponding to a respective block, wherein the instructions, when executed cause the processor to:
for each set of significant-coefficient flags, decode that set in a scan order, wherein the scan order is a diagonal scan within its respective block modified so as to
decode a significant-coefficient flag in the bottom-right-corner position within the respective block corresponding to the set, prior to decoding at least two significant-coefficient flags of a previous set in the sequence, and
decode a significant-coefficient flag in the upper-left-corner position within that respective block, after decoding at least two significant-coefficient flags of a subsequent set in the sequence.

21. A non-transitory processor-readable medium storing processor-executable instructions which, when executed, configures one or more processors to reconstruct significant-coefficient flags for a transform unit, the transform unit comprising a sequence of blocks, the bitstream including sets of significant-coefficient flags, each set corresponding to a respective block, the bitstream sequencing the sets according to the order of their corresponding blocks, the bitstream encoding the significant-coefficient flags of each set in a scan order, wherein when executed the instructions cause the processors to
for each set of significant-coefficient flags, decode that set in the scan order, wherein the scan order is a modification of a block-based diagonal scan, modified to exclude a bottom-right-corner position within the block corresponding to the set and an upper-left-corner position within that block and modified to include an upper-left-corner location in a previous block and a bottom-right-corner location in a next block.

* * * * *